United States Patent
Yasuda

(10) Patent No.: US 7,764,033 B2
(45) Date of Patent: Jul. 27, 2010

(54) MOTOR DRIVING APPARATUS

(75) Inventor: Hiromu Yasuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 378 days.

(21) Appl. No.: 11/972,371

(22) Filed: Jan. 10, 2008

(65) Prior Publication Data
US 2008/0203961 A1    Aug. 28, 2008

(30) Foreign Application Priority Data
Feb. 28, 2007    (JP)    ............... 2007-049488

(51) Int. Cl.
*H02K 29/08*    (2006.01)
(52) U.S. Cl. .............. 318/400.38; 318/652; 318/685; 318/721
(58) Field of Classification Search ......... 318/127, 318/286, 400.01, 400.16, 400.29, 400.38, 318/489, 560, 652, 685, 696, 700, 721, 823; 310/10, 152, 49.32, 49.46, 156.01
See application file for complete search history.

(56) References Cited

U.S. PATENT DOCUMENTS 5,990,651 A * 11/1999 Iwazawa et al. ............. 318/685
6,013,999 A * 1/2000 Howard et al. .............. 318/685
6,791,219 B1 * 9/2004 Eric et al. ................. 310/68 B
6,954,042 B2 * 10/2005 Lee et al. ............... 318/400.38
2004/0032807 A1    2/2004 Moriai

FOREIGN PATENT DOCUMENTS

| JP | 06-067259 A | 11/1994 |
|---|---|---|
| JP | 2001-161043 A | 6/2001 |
| JP | 2002-359997 A | 12/2002 |
| JP | 2004-79715 A | 11/2004 |

* cited by examiner

*Primary Examiner*—Bentsu Ro
*Assistant Examiner*—Antony M Paul
(74) *Attorney, Agent, or Firm*—Canon U.S.A., Inc. I.P. Division

(57) ABSTRACT

A controller for a motor driving apparatus switches a direction of electricity flowing through a first coil according to a first lead angle signal obtained based on a first magnetic pole detecting signal and a second magnetic pole detecting signal. The controller switches a direction of electricity flowing through a second coil according to a second lead angle signal obtained based on the first magnetic pole detecting signal and the second magnetic pole detecting signal. Thus, a motor driving apparatus can be configured such that the angle of the rotation center of the rotor with respect to two magnetically sensitive poles can freely be selected.

5 Claims, 11 Drawing Sheets

MOTOR DRIVING APPARATUS

BACKGROUND OF THE INVENTION

1. Field of the Invention

The present invention relates to a motor driving apparatus that includes a position detecting unit.

2. Description of the Related Art

Stepping motors have such characteristics as its small size, high torque and long life, thus easily realizing digital position control operations under the open loop control. Hence, the stepping motors have widely been used for information home appliances, such as cameras and optical disk devices, and for business appliances, such as printers and projectors.

However, when a stepping motor performs high-speed operation or performs operation under heavy load, problems arise in that the stepping motor may step out, and the driving efficiency of the stepping motor is lower than that of a brushless motor or DC motor.

In order to solve the problems, there is provided a conventionally known technique for preventing the stepping out of the motor. According to this technique, an encoder is mounted on the stepping motor, and the electricity is switched on/off according to the position of the rotor, thus accomplishing an operation of the so-called brushless DC motor.

Japanese Patent Publication No. 06-067259 and Japanese Patent Application Laid-Open No. 2002-359997 discuss such motors. According to these techniques, the rise delay of current is compensated for so as to enable high-speed operations, by advancing the phase of a signal obtained by a non-contact type sensor mounted in the motor according to the speed and also switching the current to flow through the coil according to the signal.

In the motors discussed in the above patent documents, it is necessary to mount two magnetic sensors with high accuracy. The necessity will now be described.

FIG. 11 illustrates the torque on a rotor when a constant current flows through coils. Because currents can flow through the two coils respectively in the forward and backward directions, four types of torque distributions can be generated as illustrated in FIG. 11. These distributions have the same wave form substantially in a sine wave form and have a phase difference of 90° in electrical angle.

The electrical angle expresses one cycle of the sine wave at 360°. When the number of poles of the rotor is n, the actual angle is (2×electrical angle)/n.

When the motor is driven to rotate, the electricity is sequentially switched on to flow through the coils, thereby always obtaining the high torque having a torque waveform T1 illustrated in FIG. 11. At this time, the electricity is switched on to flow through the coils at a timing determined based on a signal from a magnetic sensor. If two magnetic sensors are arranged with a space at 90° electrical angle from each other, the electricity can be switched at the most efficient timing.

However, if there is an error in the set position of the magnetic sensor, the torque waveform is deteriorated as illustrated by T2 in FIG. 11, thus decreasing the motor efficiency.

Therefore, it is necessary to perform a process for correcting the set position of the magnetic sensor at the assembling of the motor, resulting in increasing the manufacture cost and decreasing the motor quality.

Japanese Patent No. 3621696 solves the above-mentioned problem as follows. Two magnetically sensitive poles are provided in one chip, which is a magnetic sensor having an opening. An angle between straight lines connecting the centers of the magnetically sensitive poles to the center of the rotary shaft is half (½) of an angle between the straight lines connecting the centers of adjacent magnetic poles of a magnet to the center of the rotary shaft.

With this configuration, the two magnetically sensitive poles can be arranged with a space based on the component level. In addition, the electricity is switched on to flow through the coils at an optimum timing so as to avoid the torque down of the motor.

Signals output from the two magnetically sensitive poles are generated to have a 90° phase difference from each other. Thus, the timing to switch the electricity to flow through the coils is controlled according to whether the signals are positive or negative, thus realizing the motor with high efficiency.

The position of the magnetic sensor is determined based on the opening thereof, thus enabling setting the position of the magnetic sensor with high accuracy. However, the method discussed in Japanese Patent No. 3621696 has a problem in that the degree of freedom of setting the magnetic sensor decreases. This problem will now be described.

In order to increase the efficiency of the motor as described above, it is necessary that a current flowing through the first coil has a phase difference of 90° in electrical angle from a current flowing through the second coil. Thus, according to the technique discussed in Japanese Patent No. 3621696, an angle between the straight lines connecting the centers of the magnetically sensitive poles to the center of the rotary shaft is half (½) of an angle between the straight lines connecting the centers of adjacent magnetic poles of the magnet to the center of the rotary shaft.

More specifically, once the number of poles of the motor and the positions of the sensors in radial direction are determined, the distance between the two sensors is determined. Therefore, it is necessary to prepare individual special sensors according to the number of poles of the motor or the size of the magnet, thus complicating the reduction of the cost of the sensors.

SUMMARY OF THE INVENTION

The present invention is directed to a method for freely selecting an angle between straight lines connecting the rotation center of the rotor to the two magnetically sensitive poles.

According to an aspect of the present invention, a motor driving apparatus is provided which includes a rotatable rotor that includes a magnet magnetized to n poles in a multipolar manner in a circumferential direction; a first coil; a second coil; a first magnetic pole detecting unit including a first magnetically sensitive pole that senses a magnetic field change occurring as the magnet rotates; a second magnetic pole detecting unit including a second sensing pole that senses a magnetic field change occurring as the magnet rotates; and a control unit configured to switch a direction of electricity flowing through the first coil according to a first corrected signal calculated using a first arithmetic equation including a first detected signal detected by the first magnetic pole detecting unit and a second detected signal detected by the second magnetic pole detecting unit, and to switch a direction of electricity flowing through the second coil according to a second corrected signal calculated using a second arithmetic equation, different from the first arithmetic equation, including the first detected signal detected by the first magnetic pole detecting unit and the second detected signal detected by the second magnetic pole detecting unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

First Exemplary Embodiment

Figure 1:
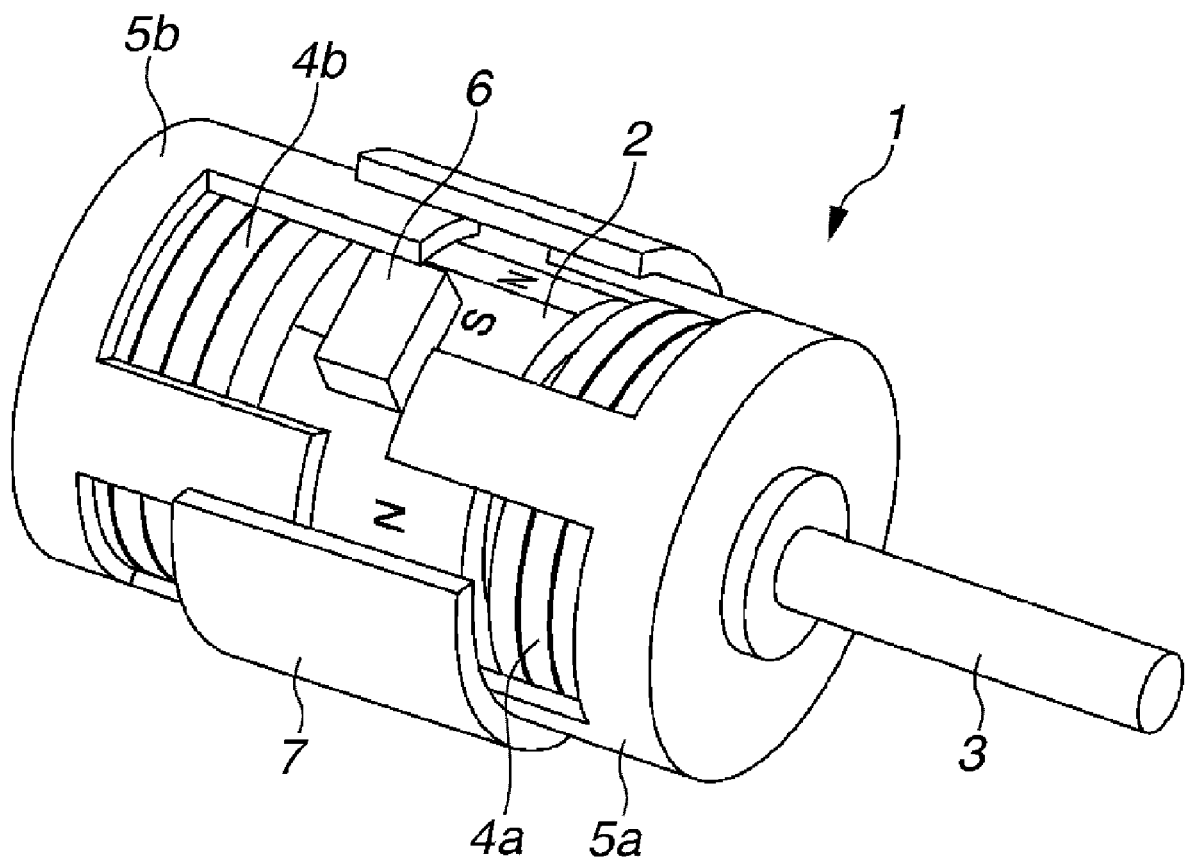
FIG. 1 is a perspective view of an example stepping motor according to a first exemplary embodiment of the present invention.

FIG. 1 is a perspective view of a stepping motor 1 according to a first exemplary embodiment of the present invention. The stepping motor 1 includes a rotor 3 having a magnet 2, a first coil 4a, a second coil 4b, a first yoke 5a, a second yoke 5b, a magnetic sensor 6, and a motor cover 7. The first coil 4a, the second coil 4b, the first yoke 5a, the second yoke 5b, the magnetic sensor 6, and the motor cover 7 constitute a stator.

The magnet 2 is a permanent magnet having a cylindrical shape and magnetized to n poles in a multipolar manner in a circumferential direction. The magnet 2 has a magnetization pattern in which the magnetic force in a radial direction changes in a sine wave form with respect to the angular position. In the present exemplary embodiment, the magnet 2 is magnetized to n=eight poles.

The rotor 3 is supported to be rotatable relative to the stator and is integrated with the magnet 2. The first coil 4a includes wires that are wound several turns around and are wound around a bobbin with the rotation center of the rotor 3 as the center axis. The second coil 4b includes wires that are wound several turns around and are wound in a bobbin around the rotation center of the rotor 3 as the central axis.

The first yoke 5a includes a plurality of magnetic pole teeth, which can be excited by the first coil 4a. If the poles to be excited are changed, the torque to be applied to the rotor 3 can be changed as well. The second yoke 5b includes a plurality of magnetic pole teeth, which can be excited by the second coil 4b. If the poles to be excited are changed, the torque to be applied to the rotor 3 can be changed as well.

The magnetic sensor 6 is a non-contact type magnetic sensor unit, such as a Hall element, which detects the magnetic flux of the magnet 2. The magnetic sensor 6 includes first and second magnetically sensitive poles 6a and 6b, which are arranged to have a space d therebetween (see FIG. 2).

The magnetic sensor 6 has two output terminals, each of which outputs a voltage that is in proportion to the magnetic flux density passing through the magnetically sensitive pole 6a or 6b. If the magnetic flux density passing through the magnetically sensitive pole is the N pole, the associated output terminal outputs a positive voltage. If the magnetic flux density is the S pole, the associated output terminal outputs a negative voltage.

Figure 11:
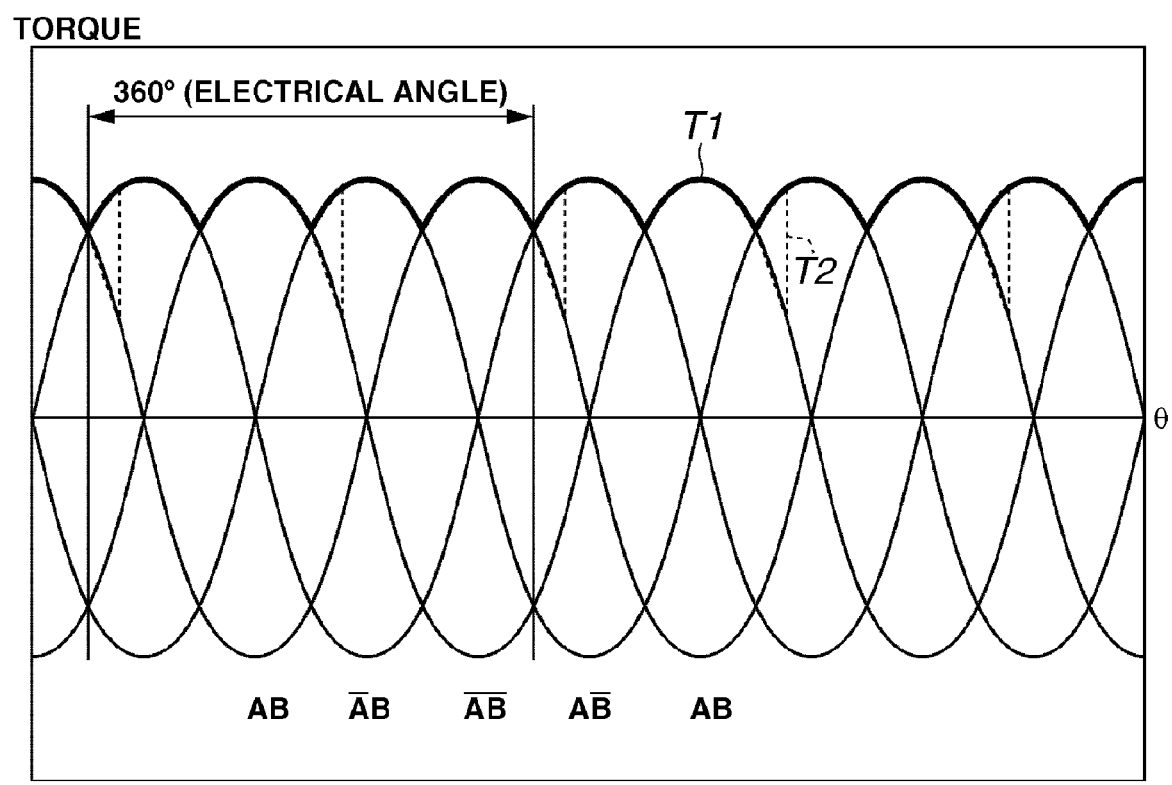
FIG. 11 is a characteristic diagram regarding a conventional stepping motor.

The angular position of the magnetic sensor 6 is set such that the first magnetically sensitive pole 6a is located at a middle point between two adjacent magnetic pole teeth of the first yoke 5a. A signal from the second magnetically sensitive pole 6b is corrected according to a method (as will be described below), thereby changing the current at such a timing as to obtain the highest torque of the motor as illustrated by T1 in FIG. 11.

If a soft magnetic back yoke is arranged on the periphery of the magnetic sensor 6, the magnetic flux density passing through the magnetic sensor 6 can be increased, and the output of the magnetic sensor 6 can be increased as well.

The motor cover 7 is made from a cylindrical member including a non-magnetic material. The first yoke 5a and the second yoke 5b are coaxially fixed to the motor cover 7 with a predetermined phase difference from each other. The magnetic sensor 6 is fixed to the motor cover 7 at a predetermined angle from each yoke. For explanation sake, FIG. 1 illustrates the motor cover 7 partially in a fractured form.

The positional relation of the magnetically sensitive poles 6a and 6b of the magnetic sensor 6 in the rotation direction in the stepping motor 1 is described below.

Figure 2:
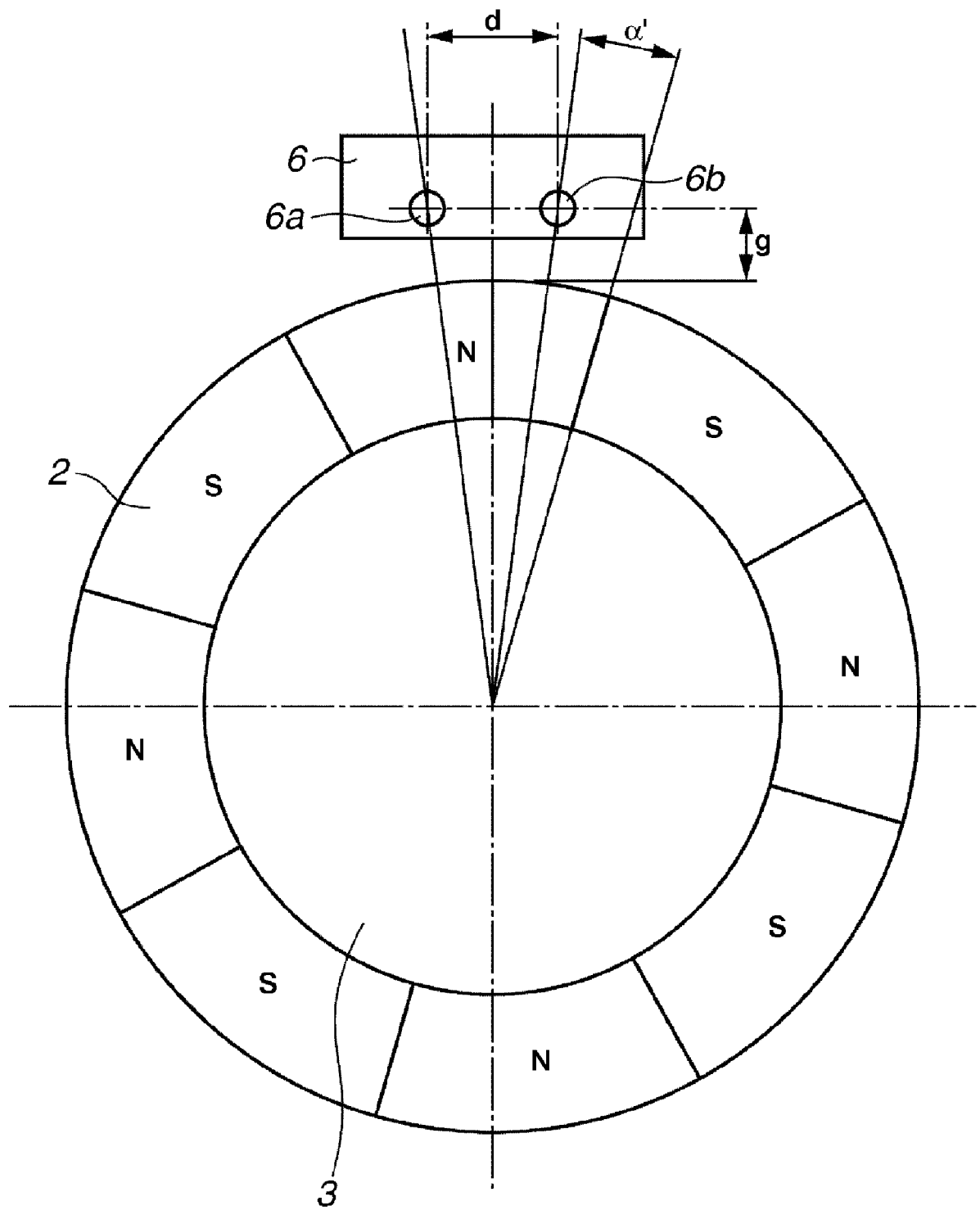
FIG. 2 is a cross sectional view of the stepping motor illustrated in FIG. 1, taken along a plane perpendicular to the rotor center axis and passing through magnetically sensitive poles of a magnetic sensor.

FIG. 2 is a cross sectional view of the stepping motor illustrated in FIG. 1, taken along a plane perpendicular to the center axis of the rotor 3 and passing through the magnetically sensitive poles 6a and 6b of the magnetic sensor 6. For clarity of the illustration, FIG. 2 illustrates the positional relationship only among the magnet 2, the rotor 3, and the magnetic sensor 6.

The magnetically sensitive poles 6a and 6b of the magnetic sensor 6 can be arranged as near as possible to the magnet 2 so as to enhance the signal output and to reduce the effect of noise. In the present exemplary embodiment, the magnetic sensor 6 is located above the surface of the magnet 2 with a space g of approximately 0.5 mm from that surface, while the magnetic sensor 6 is not in contact with the magnet 2.

If the spaced between the magnetically sensitive poles 6a and 6b of the magnetic sensor 6 is increased, the size of the magnetic sensor 6 is also increased, thus complicating miniaturization of the motor. In order to avoid this, an appropriate value of the distance d is set between the magnetically sensitive poles 6a and 6b.

In the thus-configured motor, the angle between straight lines connecting centers of the two magnetically sensitive poles 6a and 6b of the magnetic sensor 6 to the rotation center of the rotor 3 is not always half of the angle between straight lines connecting centers of the adjacent magnetic poles of the magnet 2 to the rotation center of the rotor 3.

More specifically, a phase difference in signals output from the two magnetically sensitive poles 6a and 6b is not always 90° in electrical angle, thus resulting in a locational error $\alpha'°$ ($\alpha° = n/2 \times \alpha'°$ in electrical angle) illustrated in FIG. 2. Thus, if the electricity is switched on/off to flow through the coils 4a and 4b according to such signals, the motor torque decreases.

In the present exemplary embodiment, however, signals having a phase difference of 90° in electrical angle are generated to avoid a decrease in the motor torque, according to a method as will be described below.

Figure 3:
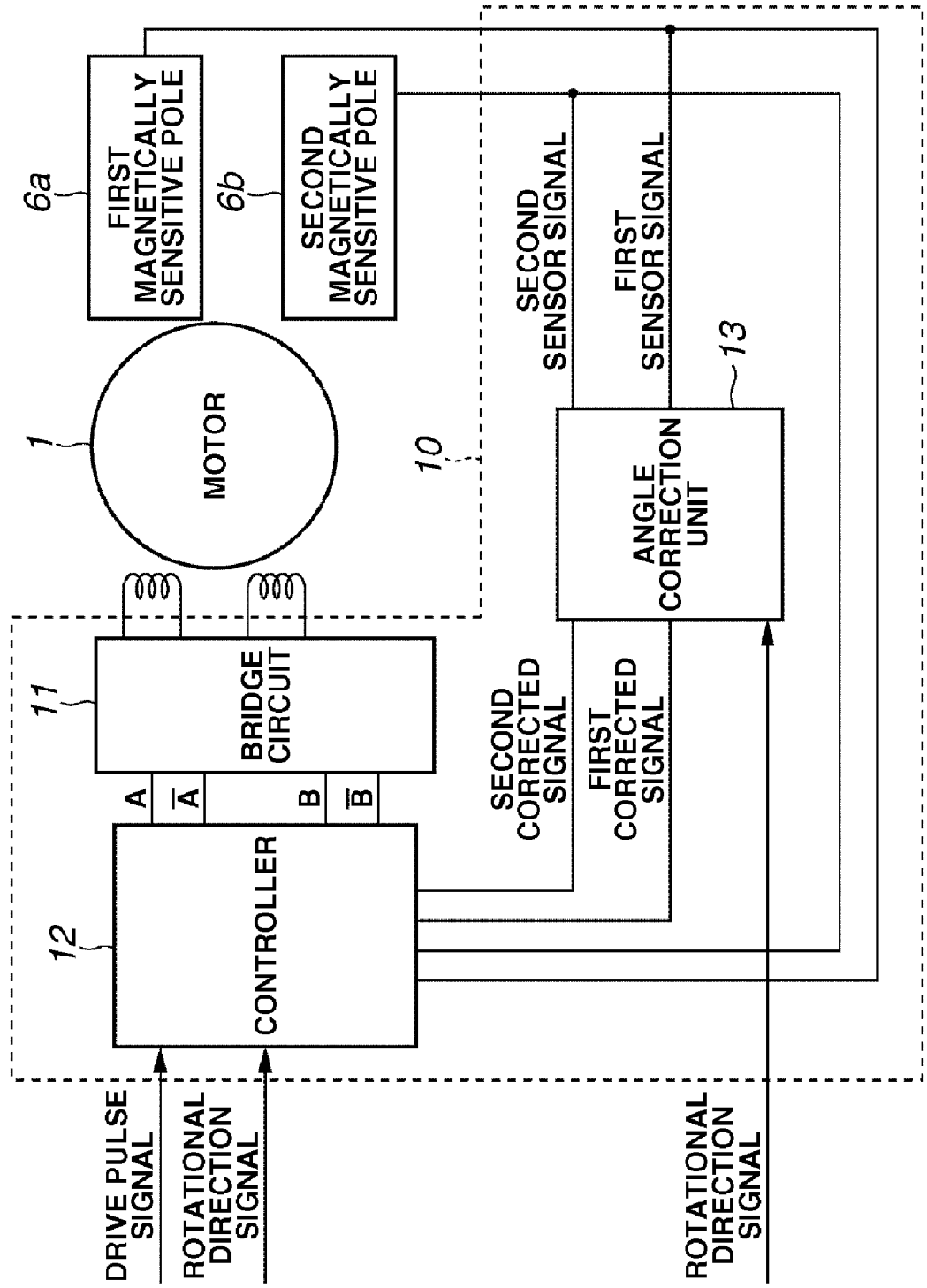
FIG. 3 is a diagram illustrating an example driving circuit for the stepping motor illustrated in FIG. 1.

FIG. 3 is a diagram illustrating a driving circuit for the stepping motor 1 illustrated in FIG. 1. A driving circuit 10 illustrated in FIG. 3 is used for driving the motor 1 having the above-described configuration. The driving circuit 10 includes a bridge circuit 11, a controller 12, and an angle correction unit 13.

The bridge circuit 11 controls a current of a predetermined direction to flow through the first and second coils 4a and 4b in response to input signals.

The controller 12 controls a current to flow through the bridge circuit 11 in response to an externally input rotational direction signal and drive pulse signal. The current flowing through the first coil 4a is switched on/off at timing the sign of a first corrected signal is changed, while the current flowing through the second coil 4b is switched on/off at timing the sign of a second corrected signal is changed. The controller 12 counts a first sensor signal and a second sensor signal and turns off the electricity when the counted signal reaches a predetermined pulse.

Note that there is no restriction on the specific operational method for the controller 12. Other techniques can be used for switching the current to flow through the coils upon reaching a predetermined rate or a predetermined position, or used for changing to the open loop control, such as the micro-step drive, according to the application method or control method of the motor.

The angle correction unit 13 generates the first and second corrected signals based on sensor signals from a first sensor (the first magnetically sensitive pole 6a) and a second sensor (the second magnetically sensitive pole 6b) and a specified rotational direction signal.

As described above, the phase difference between the first and second sensor signals is not always 90° in electrical angle, and the signals have a locational error of $\alpha°$. If these signals are used directly for controlling the timing to switch the electricity on/off for the coils, the motor torque may decrease.

The angle correction unit 13 corrects the locational error of $\alpha°$ and generates the first corrected signal and the second corrected signal, which has a 90° phase difference from the first corrected signal. The first and second corrected signals are input to the bridge circuit 11 via the controller 12 to be used as signals for instructing the timing to turn the electricity on/off for the coils 4a and 4b.

The angle correction unit 13 will be described below. As described above, the magnet 2 is magnetized such that its magnetic force in radial direction will be in a sine wave form with respect to the angular position. Thus, the signal obtained from the first magnetically sensitive pole 6a is expressed as $\sin \theta$, where $\theta$ is the electrical angle.

As described above, the second magnetically sensitive pole 6b is arranged to have a phase difference of $(90-\alpha)°$ in electrical angle from the first magnetically sensitive pole 6a. Thus, the signal obtained from the second magnetically sensitive pole 6b is defined as $\cos(\theta-\alpha)$.

Now, coefficients A and B are examined. The first corrected signal is expressed as first sensor signal×cos(A)+second sensor signal×sin(A), while the second corrected signal is defined as second sensor signal×cos(B)−first sensor signal×sin(B).

Since the first and second sensor signals have the same cycles, resultant signals obtained by multiplying the signals with a predetermined coefficient have the same cycles as their original signals, and only their phase difference and the amplitudes change. Thus, by using the first sensor signal and the second sensor signal, there exist coefficients A and B for generating signals having a 90° phase difference from each other by correcting the location error $\alpha$, as follows:

$$\sin(\theta)\cos(A)+\cos(\theta-\alpha)\sin(A)=Y1\sin(\theta) \quad (1)$$

$$\cos(\theta-\alpha)\cos(B)-\sin(\theta)\sin(B)=Y2\cos(\theta) \quad (2)$$

The coefficients A and B are determined based on the location error $\alpha$. In this case, it is apparent that A=0. Specific values of the coefficients A and B will be described below in more detail. In this case, Y1 and Y2 are amplitudes of the first and second corrected signals, respectively.

The signals are thus corrected according to the above method, thereby generating electricity switching signals for the motor without step-out. Similar to the techniques discussed in Japanese Patent Publication No. 06-067259 and Japanese Patent Application Laid-Open No. 2002-359997, a signal with a lead angle of x° based on the signal output form the magnetic sensor 6 is first generated, and the efficiency of the motor can be enhanced by switching the electricity on/off for the coils 4a and 4b according to the generated signal.

The reason for this will be described below. The current flowing through the coils rises with a delay in its nature. As the motor is operated at high speed, the electricity is switched on/off for the coils at short intervals. That is, while a current has not risen sufficiently, further electricity is switched on for the coils.

In order to reduce this effect, a signal with a lead angle is generated, so that the electricity is switched on early enough to make a sufficient current flow, and the torque can be produced even at the high-speed operation.

To realize this, correction coefficients A and B can be so obtained as to generate signals:

$$\sin(\theta)\cos(9A)+\cos(\theta-\alpha)\sin(A)=Y1\sin(\theta+x) \quad (3), \text{ and}$$

$$\cos(\theta-\alpha)\cos(B)-\sin(\theta)\sin(B)=Y2\cos(\theta+x) \quad (4),$$

as the first and second corrected signals. The correction coefficients A and B are determined based on the locational error $\alpha$ and the lead angle x.

Figure 4:
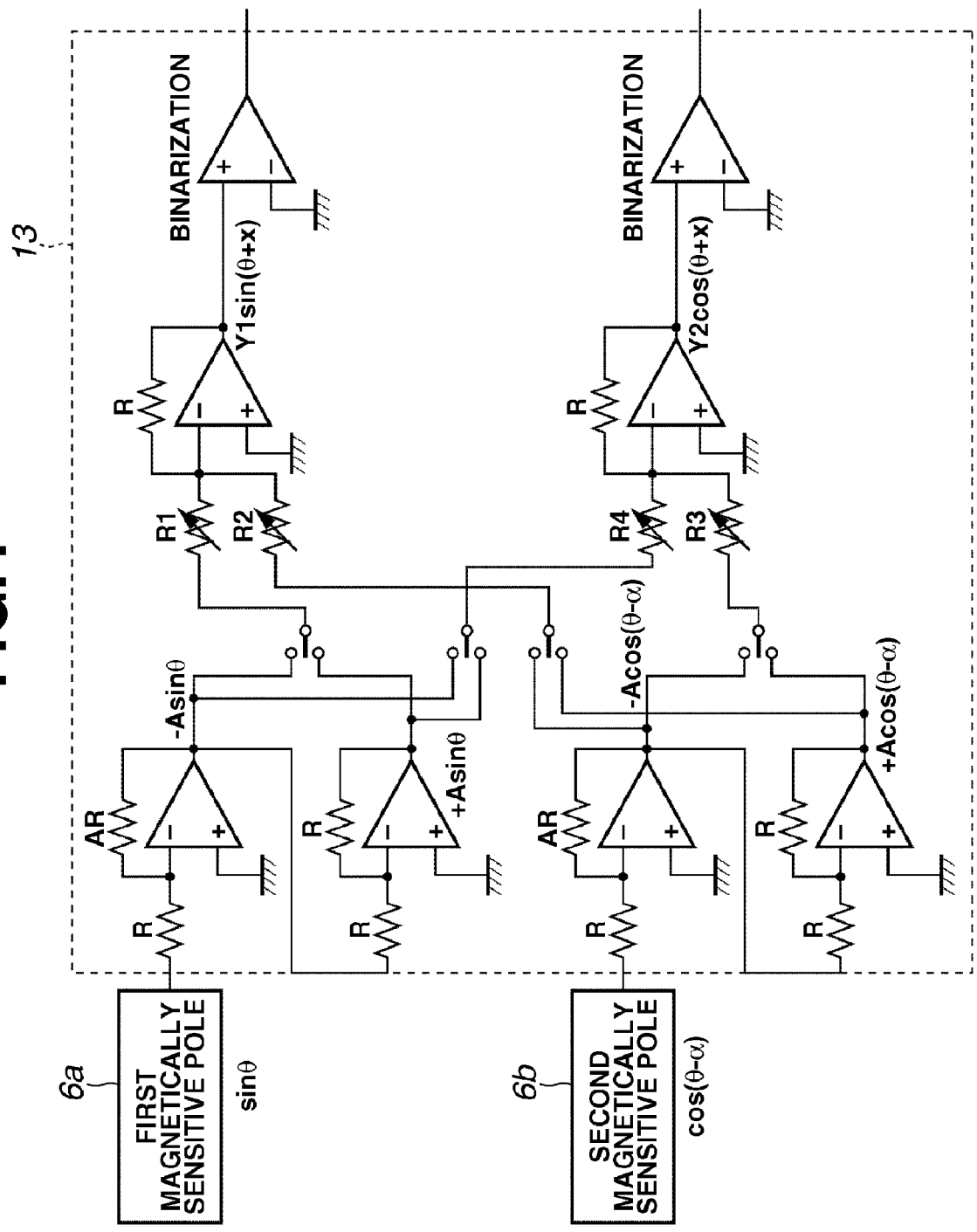
FIG. 4 is a circuit diagram of an example angle correction unit illustrated in FIG. 3.

FIG. 4 is a circuit diagram of the angle correction unit 13 illustrated in FIG. 3. In FIG. 4, equation (3) and equation (4) can be realized when values of variable resistors R1, R2, R3, and R4 are R/R1=cos(A), R/R2=sin(A), R/R3=cos(B), and R/R4=cos(B), respectively.

The variable resistors R, R1, R2, R3, and R4 are only positive values. However, as illustrated in FIG. 4, equations (3) and (4) can be realized even if the correction coefficients A and B are negative values, by preparing inverted signals of $\sin \theta$ and $\cos(\theta-\alpha)$ and selecting an inverted signal according to whether the coefficients A and B are positive or negative.

Values of sin(A), cos(A), sin(B), and cos(B) only express the relationship between the coefficients A and B and do not restrict their amplitude. For example, when A=30° and B=35°, the coefficients may be sin(30°), cos(30°), sin(35°) and cos(35°) or may be twice the respective values. The corrected values are binarized by a comparator. The direction of the electricity for the coils is changed according to the change of the signals.

As described above, the efficiency of the motor can be improved by advancing the phase from a normal position. This is because the effect of the response delay of the current flowing through the coils is reduced.

During a reverse rotation of the rotor 3, a lead angle signal in a direction opposite to that of the normal rotation of the rotor 3 is generated, thus obtaining a similar effect as that of the normal rotation. The electricity is switched on to flow through the coils 4a and 4b according to the generated signal, thereby reducing the response delay of the current flowing through the coils 4a and 4b.

For example, when the rotor 3 is reverse-rotated, corrected signals that satisfy equations (5) and (6) as follows can be generated:

$$\sin(\theta)\cos(A)+\cos(\theta-\alpha)\sin(A)=Y1\sin(\theta-x) \quad (5)$$

$$\cos(\theta-\alpha)\cos(B)-\sin(\theta)\sin(B)=Y2\cos(\theta-x) \quad (6)$$

Figure 5:
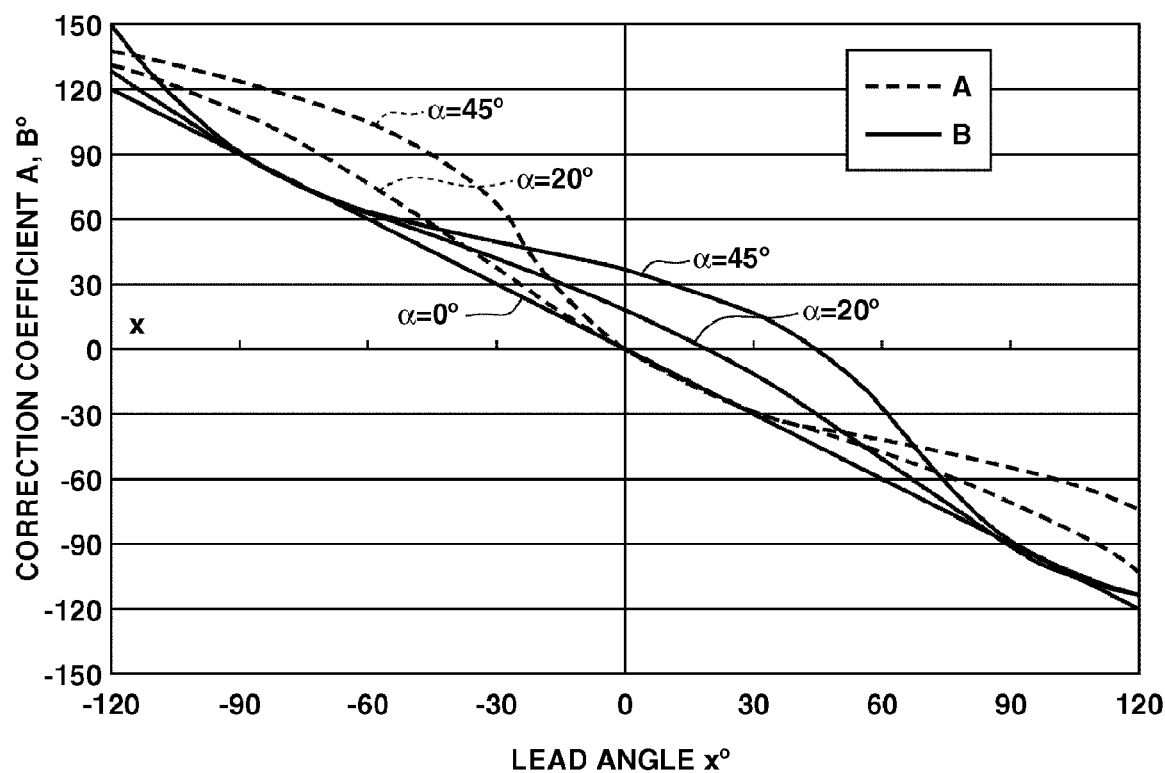
FIG. 5 is a characteristic diagram regarding the stepping motor illustrated in FIG. 1.

The correction coefficients A and B will be described below. The correction coefficients A and B are determined based on the locational error α and the lead angle x. On examination of the relationships among the correction coefficients A and B, the locational error α, and the lead angle x that satisfy equations (3) and (4), the result illustrated in FIG. 5 can be obtained. Note that FIG. 5 illustrates three cases where the location error α is 0°, 20°, and 45°.

The relationships can be expressed by equations (7) and (8), using intervening variables t and s. Values of the intervening variables t and s are sequentially changed. The value of the lead angle x at this time is used to enter the horizontal axis, while the value of the correction coefficient A or B is used to enter the vertical axis, thereby obtaining the relationship illustrated in FIG. 5. Using the equations (7) and (8), the correction coefficients A and B based on the arbitrary locational error α and the lead angle x can be determined.

$$x = t - \frac{\alpha\cos 2t}{4\cos\frac{\alpha}{2}} + \frac{\alpha}{2} \quad (7)$$

$$A = -t - \frac{\alpha\cos 2t}{4\cos\frac{\alpha}{t}}$$

$$x = s + \frac{\alpha\cos 2s}{4\cos\frac{\alpha}{2}} + \frac{\alpha}{2} \quad (8)$$

$$B = -s + \frac{\alpha\cos 2s}{4\cos\frac{\alpha}{2}}$$

The first and second corrected signals are generated based on equations (3) and (4), using thus obtained correction coefficients A and B. As a result, even if the phase difference between the first sensor signal and the second sensor signal is not 90°, the first corrected signal, which has been advanced by x° from the first sensor signal, and the second corrected signal having a 90° phase difference from the first corrected signal can be generated.

Figure 6:
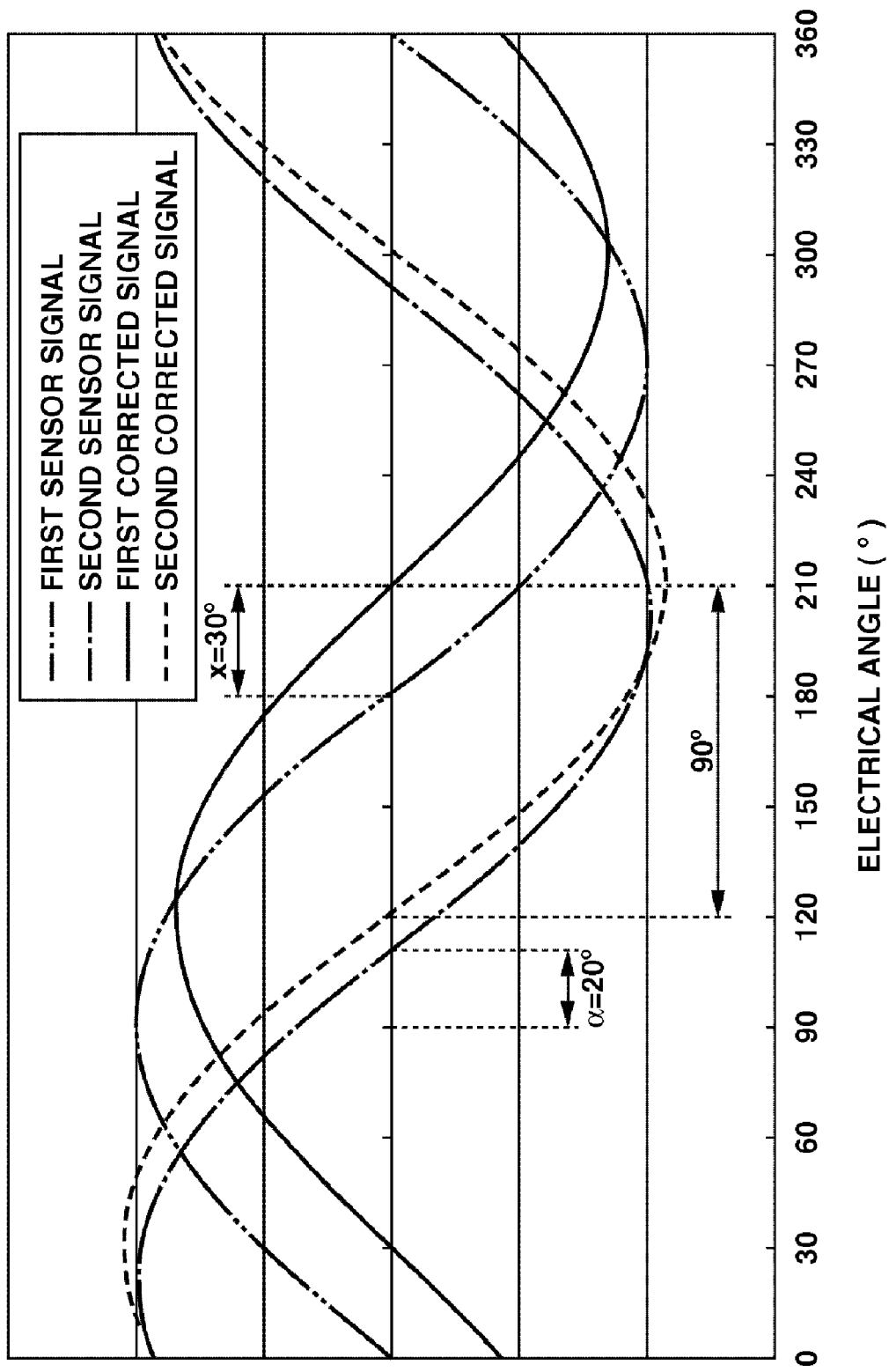
FIG. 6 is a characteristic diagram regarding the stepping motor illustrated in FIG. 1.

FIG. 6 illustrates signals obtained with the locational error α=20° and the lead angle x=30°, for example. As seen from FIG. 5, it is apparent that the correction coefficients A and B are: A=−27.0 and B=−11.4, where the locational error α=20° and the lead angle x=30°.

The first corrected signal, which has been advanced by 30° from the first sensor signal, and the second corrected signal having a 90° phase difference from the first corrected signal can be obtained based on equations (3) and (4) using the correction coefficients A and B.

Figure 7:
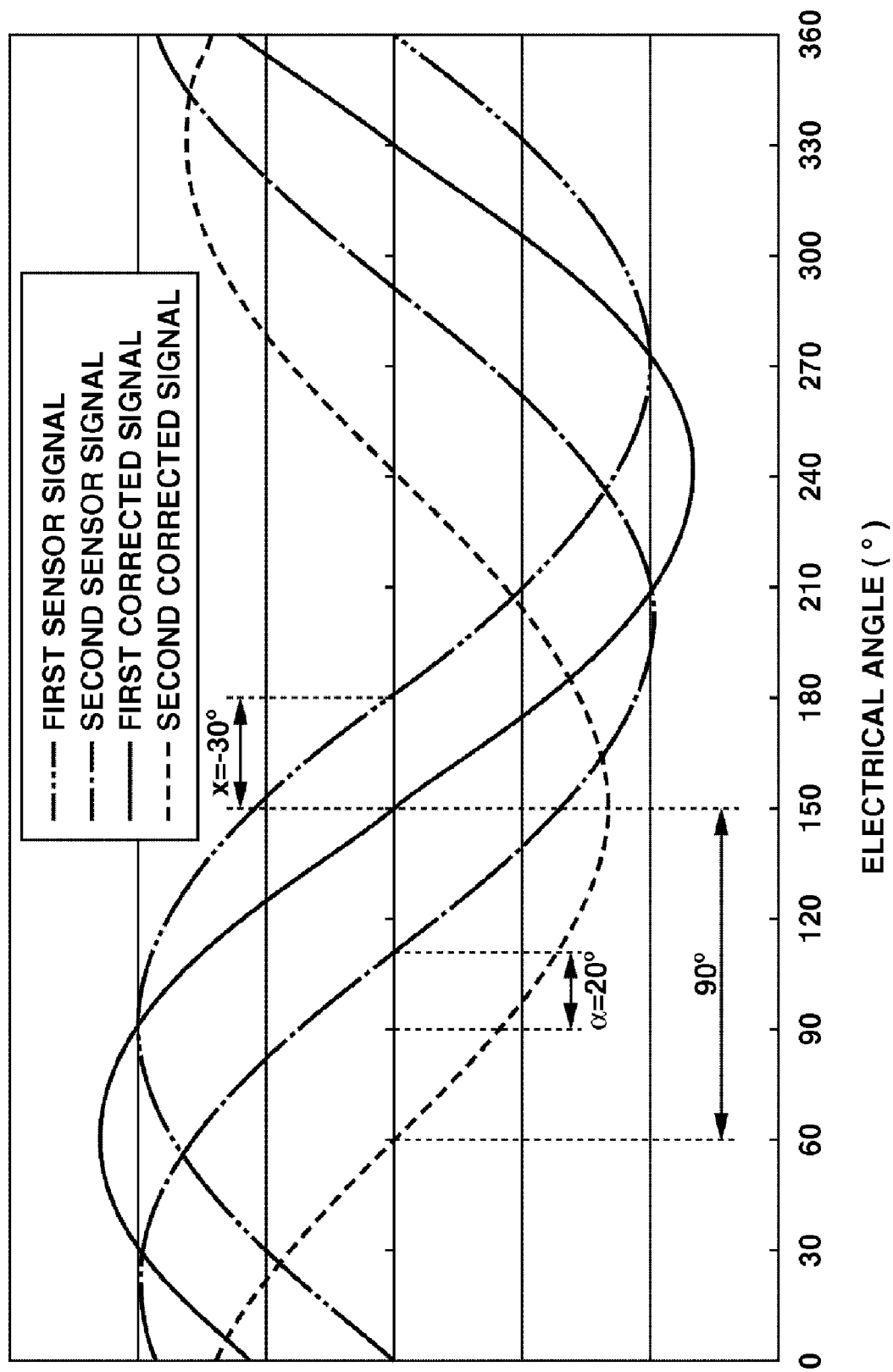
FIG. 7 is a characteristic diagram regarding the stepping motor illustrated in FIG. 1.

When the motor is reverse-rotated, correction coefficients may be read (when the lead angle x=−30°) so as to perform the same procedure. As seen from FIG. 6, the correction coefficients are: A=−37.8 and B=41.5. As a result, corrected signals illustrated in FIG. 7 can be obtained.

The locational error α of the second magnetically sensitive pole 6b can be corrected using an arbitrary value except 90°. However, if the locational error α approaches 90°, the amplitude of the corrected signal decreases, thus deteriorating the S/N ratio. As a result, the motor will be sensitive to the noise effect, thus easily causing an error operation. According to the present exemplary embodiment, though the locational error a can arbitrarily be corrected, it is still desired that the locational error α be a small value.

Figure 8:
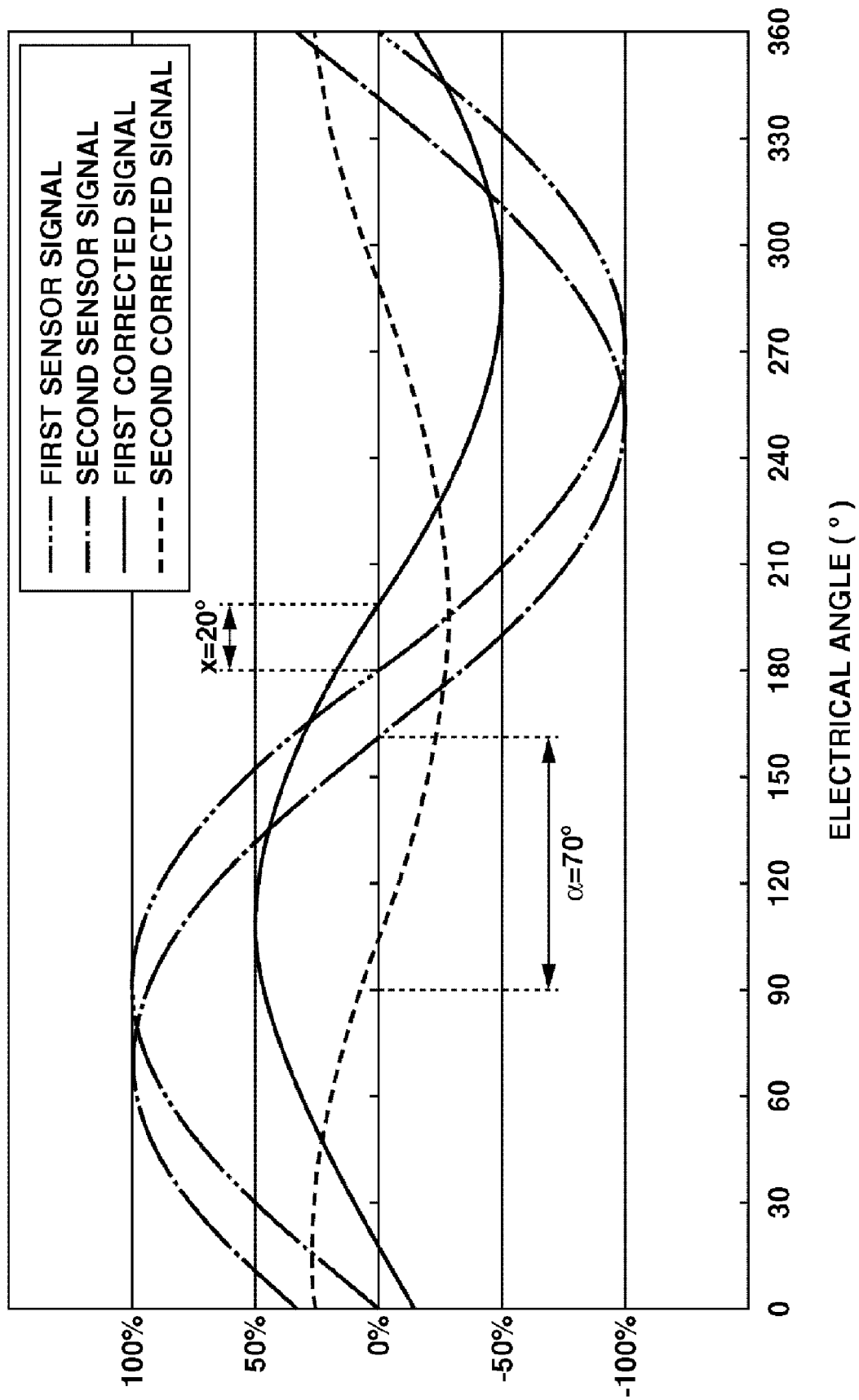
FIG. 8 is a characteristic diagram regarding the stepping motor illustrated in FIG. 1.

FIG. 8 illustrates signals in which the locational error α=70° and the lead angle x=20°, for example. The amplitude of the corrected signal is 50% or lower than that of the signal from the sensor. This indicates that the S/N ratio has been deteriorated.

In the present exemplary embodiment, the phase difference between two signals is so corrected by the electrical circuit as to always be 90°. Therefore, the angle between the straight lines connecting the centers of the two magnetically sensitive poles 6a and 6b of the magnetic sensor 6 to the rotation center of the rotor 3 may not be half of the angle between the straight lines connecting the centers of two adjacent magnetic poles of the magnet 2 to the rotation center of the rotor 3.

Thus, the two magnetically sensitive poles 6a and 6b can be arranged with an arbitrary space therebetween. Thus, the same magnetic sensors can be used, even with different numbers of poles of the magnet 2, different diameters of the magnet 2, or different spaces between the magnet 2 and the magnetic sensor 6. The application of the magnetic sensor 6 for general purpose can reduce the overall manufacturing cost.

In the present exemplary embodiment, the distance from the magnetically sensitive poles 6a and 6b to the rotation center of the rotor 3 is not necessarily based on the space between the two magnetically sensitive poles 6a and 6b. Thus, even if the two magnetically sensitive poles 6a and 6b are arranged with a given space therebetween, the magnetic sensor 6 can be arranged in a position of a strong magnetic force, so that the magnetic sensor 6 can be insensitive to noise.

In the present exemplary embodiment, the rotation angle of the rotor 3 is detected according to a method for detecting a change in the magnetic flux density of the rotor magnet. Thus, it is not necessary to prepare special components, such as a pulse disc or an encoder magnet, for detecting positions, thus not increasing the inertia of the rotor 3, the number of components and assembly steps.

In the present exemplary embodiment, because the signal has a lead angle, even if the rotational frequency of the rotor 3 increases, the rise delay of current flowing through the coils can be compensated for, thus increasing the motor efficiency.

Not only an analog circuit can be used for correcting the locational error α and providing the lead angle x, as in the present exemplary, but also a digital circuit can be used therefor. However, it takes much time for calculation, and the circuit loads increase, when the above processing is performed through digital processes. That is, the calculation processing needs to be constantly performed during the rotation of the motor, and the calculation processing cannot smoothly be executed, particularly, when the motor rotates at a high speed. On the other hand, if the calculation is executed by a simple analog circuit as in the present exemplary embodiment, corrected signals can continuously be generated even during the high-speed rotation of the motor, because the corrected signals are generated according to simple processes.

In the present exemplary embodiment, a Hall element is used as the magnetic sensor 6. Generally, the output of the Hall element changes according to the temperature. However, the present exemplary embodiment can provide compensation for the change.

The first and second magnetically sensitive poles 6a and 6b are arranged in close proximity. In this configuration, when the temperature of the motor increases upon electricity flowing through the coils 4a and 4b, the temperatures of the two magnetically sensitive poles 6a and 6b are similar, so that their outputs change at a similar rate.

As apparent from equations (3) and (4), when the outputs of the first and second magnetically sensitive poles 6a and 6b change at a similar rate, the amplitudes of the corrected signals change at a similar rate, while their cycles and phase difference do not change.

In the present exemplary embodiment, the electricity is switched on to flow through the coils 4a and 4b at the point of time the signs of the corrected signals are switched (zero-cross point), without consideration of the amplitudes of the corrected signals. Even if the output of the magnetic sensor changes according to the temperature change, there is no effect on the electricity switching timing, as long as the outputs of the first and second magnetically sensitive poles 6a and 6b change at a similar rate.

The magnetic sensor 6 can include two magnetically sensitive poles within a single sensor, as in the present exemplary embodiment. This configuration can minimize the characteristic differences of the two sensors (two magnetically sensitive poles).

The space between the magnetically sensitive poles can be set as the size of a component. This results in a motor of stable quality and in sensitive to the assembly error. Further, as compared to the case of using two sensors each of which includes one magnetically sensitive pole, the motor can successfully be miniaturized due to a reduction in the number of components and the number of wirings.

Second Exemplary Embodiment

Figure 9:
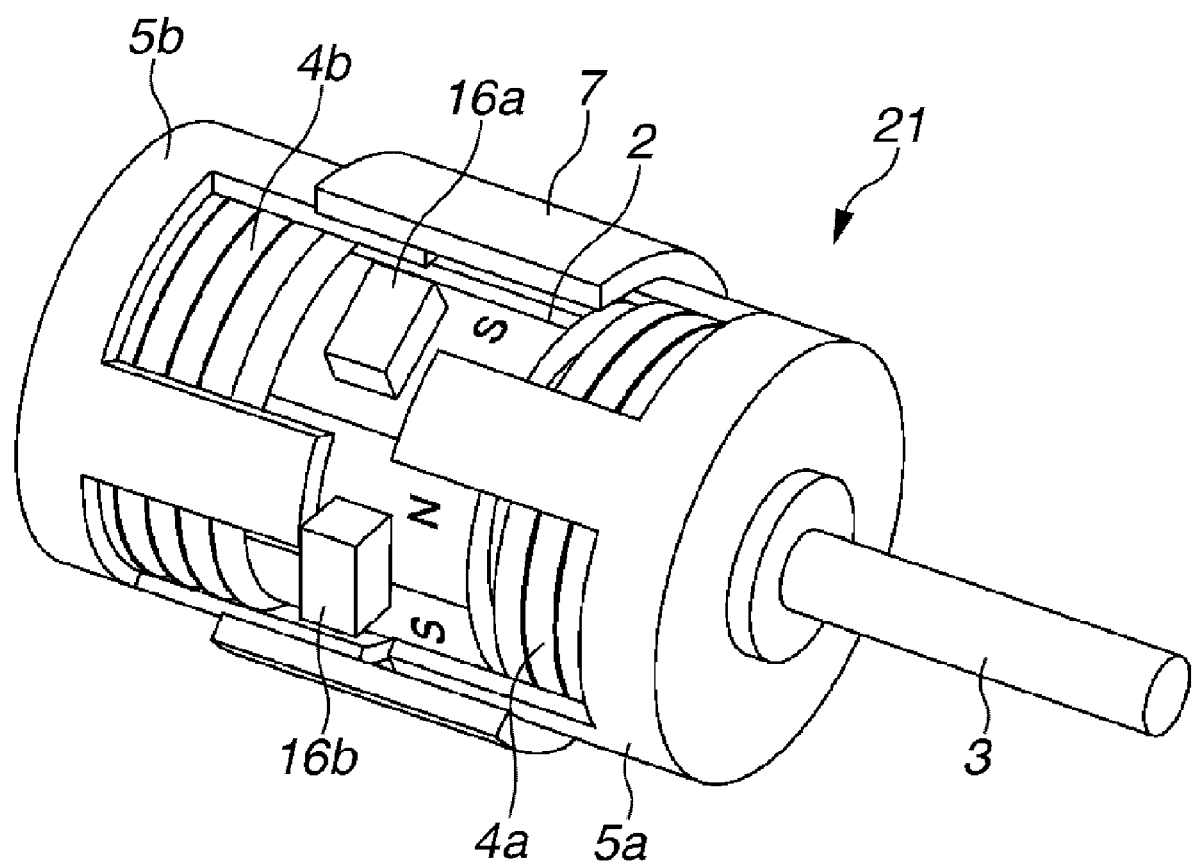
FIG. 9 is a perspective view of an example stepping motor according to a second exemplary embodiment of the present invention.
Figure 10:
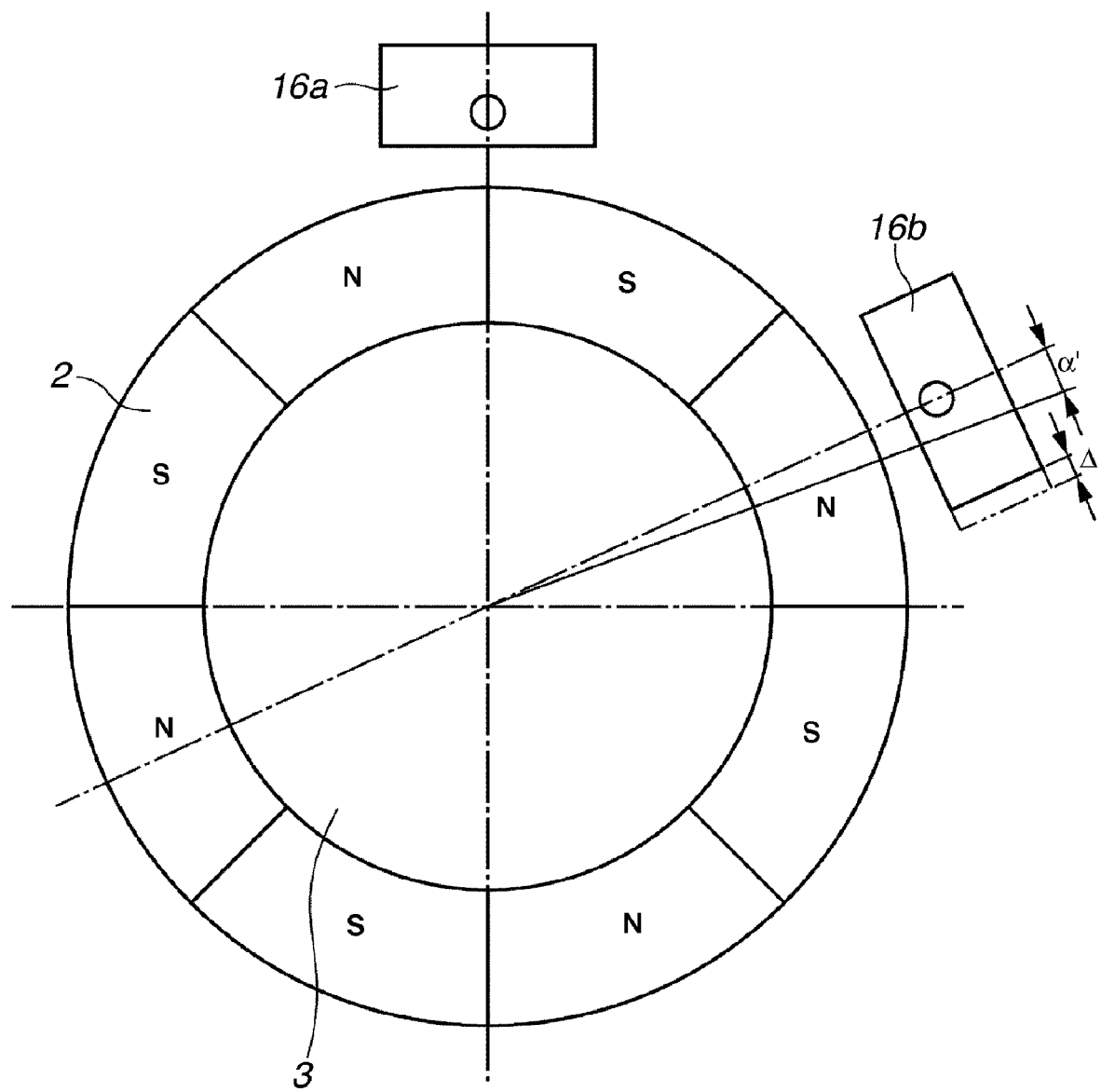
FIG. 10 is across sectional view of the stepping motor illustrated in FIG. 9, taken along a plane perpendicular to the rotor center axis and passing through a magnetic sensor.

FIG. 9 is a perspective view of a stepping motor 21 according to a second exemplary embodiment of the present invention. FIG. 10 is a cross sectional view of the stepping motor 21 illustrated in FIG. 9, taken along a plane perpendicular to the center axis of the rotor 3 and passing through a magnetic sensor. The same reference numerals are applied to components similar to those of the first exemplary embodiment, and thus the description thereof will not be repeated.

In the present exemplary embodiment, in place of the magnetic sensor 6 including two magnetically sensitive poles, a first magnetic sensor 16a and a second magnetic sensor 16b each of which includes one magnetically sensitive pole are used. That is, there are more choices of the magnetic sensor. Because the magnetic sensors can independently be arranged in their positions, a degree of freedom of the location can be increased.

Thus, the second magnetic sensor 16b can be arranged at 90° electrical angle from the first magnetic sensor 16a. If they can not be arranged with a 90° phase difference due to the interference therebetween, they can be arranged with a phase difference of N×180+90° (N is an arbitrary integer) electrical angle.

At this time, the mounting error of the magnetic sensor, which may occur at the assembly of the motor, may have an effect on the motor performance. When the set position of the magnetic sensor deviates by Δmm, the deviation angle α' of the set position is expressed by $$\alpha' \approx \tan \alpha' = \Delta/R,$$

where R is the distance from the rotation center to the magnetic sensor. Thus, the locational error α in electrical angle can be expressed by the following equation:

$$\alpha = n/2 \times \alpha' = n\Delta/2R.$$

As the motor is formed to have a small diameter and to have a number of poles, the locational error α increases. For example, in the case of a motor having 20 poles, the locational error is 0.33 [Rad]=19° when the sensor set position deviates 0.1 mm, if the magnetic sensor is set at 3 mm from the rotation center, thus causing the reduction of the motor efficiency.

This deviation is detected after the assembly of the motor, stored in the driving circuit, and corrected according to a similar method as that of the first embodiment, thereby improving the motor efficiency.

If the motor is further miniaturized, the two magnetic sensors 16a and 16b cannot be arranged with a 90° electrical angle phase difference from each other, due to the interference between the magnetic sensors or between the yoke and the magnetic sensor. In such a case, if the magnetic sensor is arranged with a higher degree of freedom according to the correction method of the present exemplary embodiment, the motor can successfully be miniaturized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-049488 filed Feb. 28, 2007, which is hereby incorporated by reference herein in its entirety.

What is claimed is:

1. A motor driving apparatus comprising:
a rotatable rotor which includes a magnet magnetized to n poles in a multipolar manner in a circumferential direction;
a first coil;
a second coil;
a first magnetic pole detecting unit including a first magnetically sensitive pole that senses a magnetic field change occurring as the magnet rotates;
a second magnetic pole detecting unit configured to have a second sensing pole that senses a magnetic field change occurring as the magnet rotates; and
a control unit configured to switch a direction of electricity flowing through the first coil according to a first corrected signal calculated using a first arithmetic equation including a first detected signal detected by the first magnetic pole detecting unit and a second detected signal detected by the second magnetic pole detecting unit, and to switch a direction of electricity flowing through the second coil according to a second corrected signal calculated using a second arithmetic equation, different from the first arithmetic equation, including the first detected signal detected by the first magnetic pole detecting unit and the second detected signal detected by the second magnetic pole detecting unit.

2. The motor driving apparatus according to claim 1, wherein the first corrected signal is calculated according to the first detected signal, the second detected signal, and a first correction value determined by a locational error of the first magnetically sensitive pole and the second magnetically sensitive pole and a lead angle set for the motor driving apparatus, and
   wherein the second corrected signal is calculated according to the first detected signal, the second detected signal, and a second correction value, different from the first correction value, determined by the locational error of the first magnetically sensitive pole and the second magnetically sensitive pole and the lead angle set for the motor driving apparatus.

3. The motor driving apparatus according to claim 2, wherein the lead angle is increased as a rotation speed of the rotor increases.

4. The motor driving apparatus according to claim 1, wherein the first corrected signal and the second corrected signal have a phase difference of 90° in electrical angle from each other.

5. The motor driving apparatus according to claim 1, wherein the first magnetically sensitive pole and the second magnetically sensitive pole are arranged within one chip.

* * * * *